United States Patent
Fujisawa et al.

(10) Patent No.: US 11,012,631 B2
(45) Date of Patent: May 18, 2021

(54) IMAGE CAPTURING AND PROCESSING DEVICE, ELECTRONIC INSTRUMENT, IMAGE CAPTURING AND PROCESSING METHOD, AND RECORDING MEDIUM

(71) Applicant: SHARP KABUSHIKI KAISHA, Sakai (JP)

(72) Inventors: Hidenori Fujisawa, Sakai (JP); Shigefumi Urata, Sakai (JP); Junki Asai, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 180 days.

(21) Appl. No.: 16/305,356

(22) PCT Filed: May 26, 2017

(86) PCT No.: PCT/JP2017/019700
§ 371 (c)(1),
(2) Date: Nov. 28, 2018

(87) PCT Pub. No.: WO2017/208991
PCT Pub. Date: Dec. 7, 2017

(65) Prior Publication Data
US 2020/0322519 A1    Oct. 8, 2020

(30) Foreign Application Priority Data

Jun. 1, 2016 (JP) .............................. JP2016-110209

(51) Int. Cl.
*H04N 5/235*    (2006.01)
*G06K 9/00*    (2006.01)
(Continued)

(52) U.S. Cl.
CPC ....... *H04N 5/2353* (2013.01); *G06K 9/00228* (2013.01); *G06K 9/00302* (2013.01);
(Continued)

(58) Field of Classification Search
CPC ............. H04N 5/2353; H04N 5/23212; G06K 9/00302; G06K 9/6289; G06K 9/00228
See application file for complete search history.

(56) References Cited

U.S. PATENT DOCUMENTS

2006/0119710 A1*  6/2006  Ben-Ezra .................. G06T 5/50
                                                    348/208.99
2007/0035628 A1*  2/2007  Kanai ................ H04N 5/23219
                                                    348/159
(Continued)

FOREIGN PATENT DOCUMENTS

CN         103002211 A     3/2013
JP       2008-047976 A     2/2008
(Continued)

*Primary Examiner* — Ahmed A Berhan
(74) *Attorney, Agent, or Firm* — ScienBiziP, P.C.

(57) ABSTRACT

The present invention has an object to enable an improvement in accuracy of face detection and obtain an optimum image in which focus and exposure are adjusted in conformity with a detected face. An image capture processing device (50) of one mode of the present invention includes: a face detection section (40) configured to perform face detection so as to detect a face from an image of a subject, the image being captured by an auxiliary image capture section 20 which captures the image of the subject; and a control section (30) configured to control, on the basis of a result of the face detection, a main image capture section (10) to capture an image of the subject.

8 Claims, 4 Drawing Sheets

(51) Int. Cl.
*G06K 9/62* (2006.01)
*H04N 5/232* (2006.01)

(52) U.S. Cl.
CPC ....... *G06K 9/6289* (2013.01); *H04N 5/23212* (2013.01); *H04N 5/232123* (2018.08)

(56) References Cited

U.S. PATENT DOCUMENTS

| | | | | |
|---|---|---|---|---|
| 2009/0284645 | A1* | 11/2009 | Nozaki | H04N 5/23219 348/349 |
| 2010/0315521 | A1* | 12/2010 | Kunishige | G11B 27/10 348/220.1 |
| 2012/0218431 | A1* | 8/2012 | Matsuoto | H04N 5/23219 348/218.1 |
| 2013/0324243 | A1* | 12/2013 | Mikhailov | A63F 13/04 463/31 |
| 2015/0009356 | A1 | 1/2015 | Sanno | |

FOREIGN PATENT DOCUMENTS

| | | | |
|---|---|---|---|
| JP | 2008-061157 A | | 3/2008 |
| JP | 2009-239935 A | | 10/2009 |
| JP | 2015-012567 A | | 1/2015 |
| JP | 2015-167308 A | | 9/2015 |
| JP | 2015167308 A | * | 9/2015 |

* cited by examiner

IMAGE CAPTURING AND PROCESSING DEVICE, ELECTRONIC INSTRUMENT, IMAGE CAPTURING AND PROCESSING METHOD, AND RECORDING MEDIUM

TECHNICAL FIELD

The present invention relates to an image capture processing device, an electronic device, an image capture processing method, and a recording medium.

BACKGROUND ART

An image capture device disclosed in Patent Literature 1 is known as a camera which has a face detection (face recognition) function of reading out an image from an image sensing element and analyzing information of characteristics of the image so as to detect face information. The image capture device of Patent Literature 1 has, as photometry modes, an evaluation photometry mode and an average photometry mode. The image capture device performs a photometry processing and an exposure control in accordance with a photometry mode set by a user. Even when the evaluation photometry mode has been set, the image capture device operates in the average photometry mode until a start of autofocus. By thus setting the average photometry mode, in which photometry of an average brightness of the entire screen is performed so as to control exposure, it is easy to detect a face even in a case where the face is in a region (e.g., at an edge of the screen) at which exposure is inappropriate.

CITATION LIST

Patent Literature

Patent Literature 1

Japanese Patent Application Publication, Tokukai, No. 2015-167308 A (Publication Date: Sep. 24, 2015)

SUMMARY OF INVENTION

Technical Problem

However, the technique according to the image capture device of Patent Literature 1 has the following problem. In a case where no face is present within an angle of view during an average photometry mode but a face later comes into the angle of view after the average photometry mode (e.g., in a case where an image of a moving subject is to be captured), face detection is not possible.

The present invention is accomplished in view of the foregoing problem. An object of the present invention is to provide an image capture processing device, an electronic device, an image capture processing method, and a program for controlling the image capture processing device each enabling an improvement in accuracy of face detection and allowing obtaining an optimum image in which focus and exposure are adjusted in conformity with a detected face.

Solution to Problem

In order to attain the object, an image capture processing device in accordance with one aspect of the present invention is an image capture processing device including: a face detection section configured to perform face detection so as to detect a face from an image of a subject, the image being captured by a first image capture section which captures the image of the subject; and a control section configured to control, on the basis of a result of the face detection performed by the face detection section, a second image capture section to capture an image of the subject, the second image capture section being different from the first image capture section.

Further, in order to attain the object, an electronic device in accordance with one aspect of the present invention is an electronic device including: the above-described image capture processing device; the first image capture section; and the second image capture section.

Further, in order to attain the object, an image capture processing method in accordance with one aspect of the present invention is an image capture processing method including: a face detection step of performing face detection so as to detect a face from an image of a subject, the image being captured by a first image capture section which captures the image of the subject; and a control step of controlling, on the basis of a result of the face detection performed in the face detection step, a second image capture section to capture an image of the subject, the second image capture section being different from the first image capture section.

Further, in order to attain the object, a program, in accordance with one aspect of the present invention, for controlling the image capture processing device is a program for controlling an image capture processing device, the program being configured to cause a computer to function as each section of the image capture processing device.

Advantageous Effects of Invention

According to the one aspects of the present invention, the first image capture section can be always used for face detection. This enables an improvement in accuracy of face detection and allows obtaining an optimum image in which focus and exposure are adjusted in conformity with a detected face.

DESCRIPTION OF EMBODIMENTS

Embodiment 1

Figure 1:
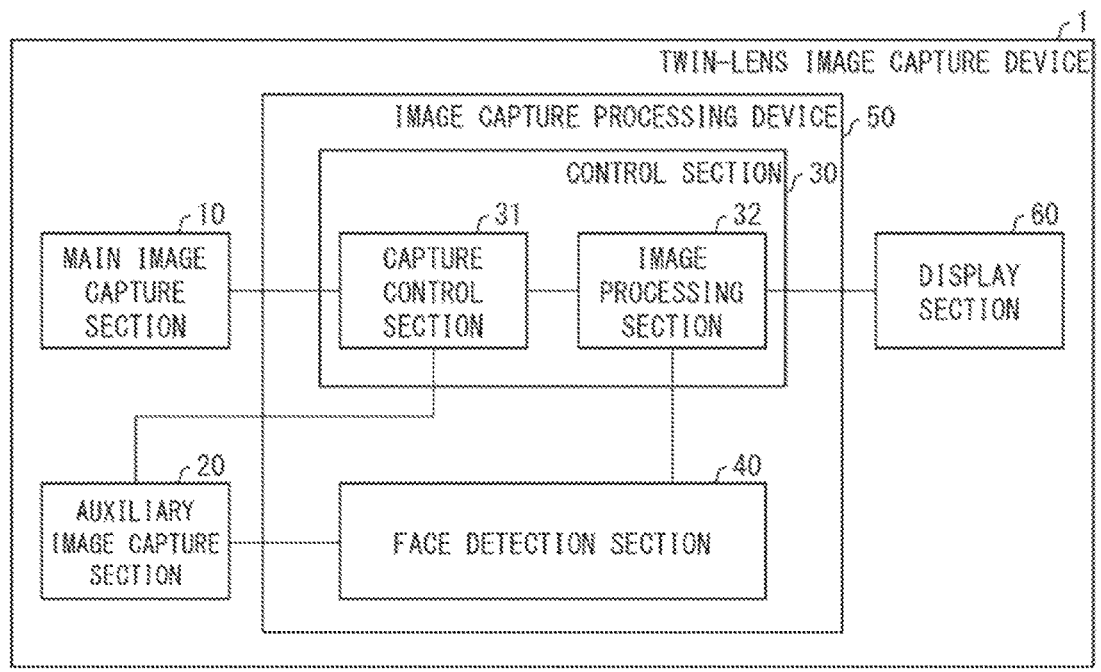
FIG. 1 is a block diagram illustrating a configuration of one mode (Embodiment 1) of an image capture processing device in accordance with the present invention together with a configuration of a twin-lens image capture device which is one mode (Embodiment 1) of an electronic device in accordance with the present invention.
Figure 2:
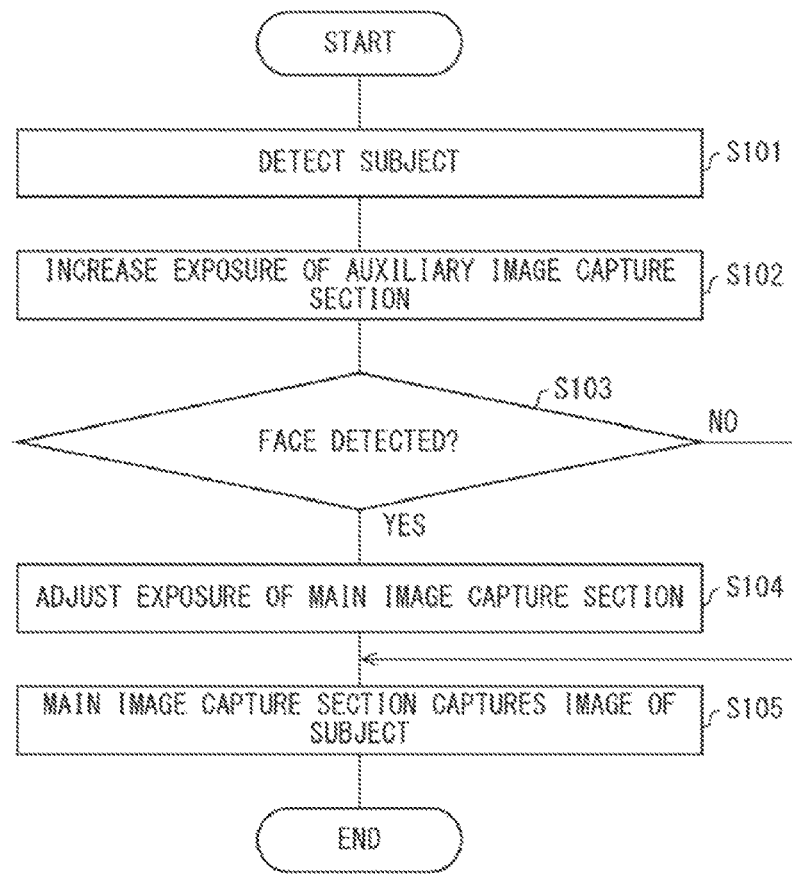
FIG. 2 is a view showing a flowchart of a processing carried out by the twin-lens image capture device of FIG. 1.

The following description will discuss Embodiment 1 of the present invention with reference to FIGS. 1 and 2. Note that, in Embodiment 1, a twin-lens image capture device will be discussed as one mode of an electronic device in accordance with the present invention, and the description will discuss an aspect in which the twin-lens image capture device includes one mode of an image capture processing device in accordance with the present invention.

FIG. 1 is a block diagram illustrating a configuration of a twin-lens image capture device 1 (electronic device) in Embodiment 1.

The twin-lens image capture device 1 of Embodiment 1 is a digital camera which is capable of capturing images of a subject from respective two viewpoints of a right eye and a left eye. Note that, as an image capture device which captures images from two viewpoints, an image capture device which creates a three-dimensional video is generally known. The twin-lens image capture device 1 of Embodiment 1 is also capable of creating a three-dimensional video by using a main image capture section 10 and an auxiliary image capture section 20 as two viewpoints of a right eye and a left eye, respectively. However, as described later, the twin-lens image capture device 1 of Embodiment 1 uses one of the two image capture sections as an image capture section dedicated for face detection, thereby always performing face detection so as to increase accuracy of face detection, and uses the other of the two image capture sections to obtain an optimum image in which focus and exposure are adjusted in conformity with a detected face.

Accordingly, the twin-lens image capture device 1 of Embodiment 1 includes, as illustrated in FIG. 1, the main image capture section 10 (second image capture section), the auxiliary image capture section 20 (first image capture section), an image capture processing device 50 including a control section 30 and a face detection section 40, and a display section 60.

(Main Image Capture Section 10 and Auxiliary Image Capture Section 20)

Each of the main image capture section 10 and the auxiliary image capture section 20 can be realized by means of an optical system and an image sensing element (CCD (Charge Couple Devices), CMOS (Complementary Metal-Oxide-Semiconductor), or the like). As described later, the main image capture section 10 is an image capturing camera which captures an image of a subject, and the auxiliary image capture section 20 is a face detection camera which is used solely for face detection.

Since the auxiliary image capture section 20 is a face detection camera, the auxiliary image capture section 20 may have a smaller number of pixels that those of the main image capture section 10. Specifically, the main image capture section 10 and the auxiliary image capture section 20 may be configured to have 20 M pixels and 5 M pixels, respectively. Setting the number of the pixels of the auxiliary image capture section 20 small enables a cost reduction, while setting the number of the pixels of the main image capture section 10 large allows generating high quality image data having a high image quality.

Note that the main image capture section 10 and the auxiliary image capture section 20 are capable of capturing a moving image as well as capturing a still image. The description below will be concerned with capturing of a still image, unless otherwise specified.

(Image Capture Processing Device 50)

The image capture processing device 50 includes (i) the face detection section 40 which detects a face from an image captured by the first image capture section which captures an image of a subject and (ii) the control section 30 which, on the basis of a result of face detection carried out by the face detection section, performs a control so that an image of the subject is captured by the main image capture section 10, which is different from the auxiliary image capture section 20.

(Control Section 30)

The control section 30 includes a capture control section 31 and an image processing section 32 as illustrated in FIG. 1.

The capture control section 31 outputs, to each of the main image capture section 10 and the auxiliary image capture section 20, a control signal for controlling exposure and focus, a timing signal (clock pulse), and the like.

The image processing section 32 receives face region information (face detection result) notified from the face detection section 40, obtains image data outputted from the main image capture section 10, performs image processing on the image data, and causes the image data thus processed to be displayed on the display section 60.

More specifically, the image processing section 32 is notified of the face region information (face detection result) on a face region detected by the face detection section 40, and the image processing section 32 in response generates, in accordance with the notification, information of exposure and focus that are appropriate for the face region. The image processing section 32 outputs the information thus generated to the capture control section 31. On the basis of the information, the capture control section 31 generates a control signal for controlling exposure and focus of the main image capture section 10, and outputs the control signal to the main image capture section 10. Determination of appropriate exposure and focus can be carried out by a known method. Note that exposure and focus of the auxiliary image capture section 20 are determined in accordance with a luminance value (brightness) of a face-detected area and a contrast value of the face-detected area, respectively.

(Face Detection Section 40)

The face detection section 40 obtains image data outputted from the auxiliary image capture section 20, and performs a face detection processing on the image data so as to detect a face region of a person included in the image. The face detection processing is performed with use of a known algorithm. For example, by means of a known processing for extracting a feature point, the face detection section 40 extracts, from data of a through-the-lens image or a captured image, feature points such as end points of an eye, a nose, and a mouse and points along an outline of a face, and detects a face region on the basis of these feature points.

(Display Section 60)

The display section 60 can be a known display means which is included in a digital camera. The display section 60 displays mainly (i) an image which is based on image data generated by the main image capture section 10 and (ii) an indication, indicated clearly over the image, of a face region detected by the auxiliary image capture section 20. Note that the display section 60 may be of a touch panel type, and can accept an instruction from a user (a user of the twin-lens image capture device 1).

Note that the twin-lens image capture device 1 of Embodiment 1 includes not only the above-described configurations but also other configurations such as, for example, an operation button and a power button. In Embodiment 1, descriptions on those configurations are omitted, and characteristic configurations of the present invention as well as configurations related to such characteristic configurations are discussed.

<Processing Flow>

With reference to FIG. 2, the following description will discuss a processing flow (image capture processing method) of the image capture processing device 50 included in the twin-lens image capture device 1 of Embodiment 1. FIG. 2 is a flowchart of the image capture processing device 50.

In a case where the main image capture section 10 and the auxiliary image capture section 20 detect a subject while the twin-lens image capture device 1 has been turned on (step S101), the capture control section 31 controls the auxiliary image capture section 20 to have an exposure condition appropriate for performing face detection. Specifically, the auxiliary image capture section 20 is controlled so that the main image capture section 10 has an exposure higher than that of the auxiliary image capture section 20 (step S102). Increasing the exposure of the auxiliary image capture section 20 which performs face detection enables facilitating the face detection. Once the exposure condition of the auxiliary image capture section 20 is controlled, the process proceeds to step S103.

At step S103 (face detection step), the face detection section 40, which has obtained image data of the subject generated by the auxiliary image capture section 20, determines whether or not a face region is included in the image. In a case where a face region is detected (Yes at step S103), the process proceeds to step S104. Meanwhile, in a case where the face detection section 40 which has obtained the image data of the subject generated by the auxiliary image capture section 20 detects no face region in the image at step S103 (No at step S103), the process proceeds to step S105.

At step S104 (control step), the face detection section 40 notifies the image processing section 32 of the face region, and the capture control section 31 adjusts the exposure of the main image capture section 10 so that the exposure is appropriate for the face region.

At step S105, data of a captured image of the subject generated by the main image capture section 10 is subjected to a predetermined pixel interpolation processing and a predetermined color conversion processing by the image processing section 32, and then is displayed on the display section 60. Note here that, in a case where the main image capture section 10 was adjusted at previous step S104 so as to make exposure for the face region appropriate, an optimum image in which the focus and exposure are adjusted in conformity with the detected face is generated by the main image capture section 10 at step S105. Meanwhile, in a case where no face was detected at step S103, an image is generated by the main image capture section 10 at step S105 through a control of the exposure and focus of the main image capture section 10 in accordance with information of an exposure area and an AF detection area which are set in the capture control section 31. For example, in a case where both a setting of the exposure area and a setting of the AF detection area are center-focused, the exposure and a focus position are adjusted in conformity with a subject appearing in a center of the screen.

Thus, according to Embodiment 1, the auxiliary image capture section 20 is used solely for face detection and capturing of an image of a subject is performed by the main image capture section 10. Accordingly, even in a case as experienced by conventional techniques where no face is included in an angle of view at first but a face later comes into the angle of view, the face is successfully detected. This enables an improvement in accuracy of face detection, and allows obtaining an optimum image in which focus and exposure are adjusted in conformity with a detected face.

Note that the description above of Embodiment 1 discussed the twin-lens image capture device 1 which uses the main image capture section 10 as a right eye and the auxiliary image capture section 20 as a left eye (or the auxiliary image capture section 20 and the main image capture section 10 can be used as a right eye and a left eye, respectively). Note, however, that the present invention is not limited to this, and can employ a configuration in which the two viewpoints are located above and below each other.

Further, the present invention encompasses an aspect in which an image of a subject is captured from three or more viewpoints.

In short, according to the present invention, an optimum image is obtained by using one of a plurality of image capture sections as an image capture section for face detection and using other one(s) of the plurality of image capture sections to capture, on the basis of a result of the face detection, an image in which focus and exposure are adjusted in conformity with a face.

Embodiment 2

The following description will discuss Embodiment 2 of the present invention. For easy explanation, the like reference signs will be given to members each having the like function as a member described in Embodiment 1, and descriptions on such a member will be omitted.

Figure 3:
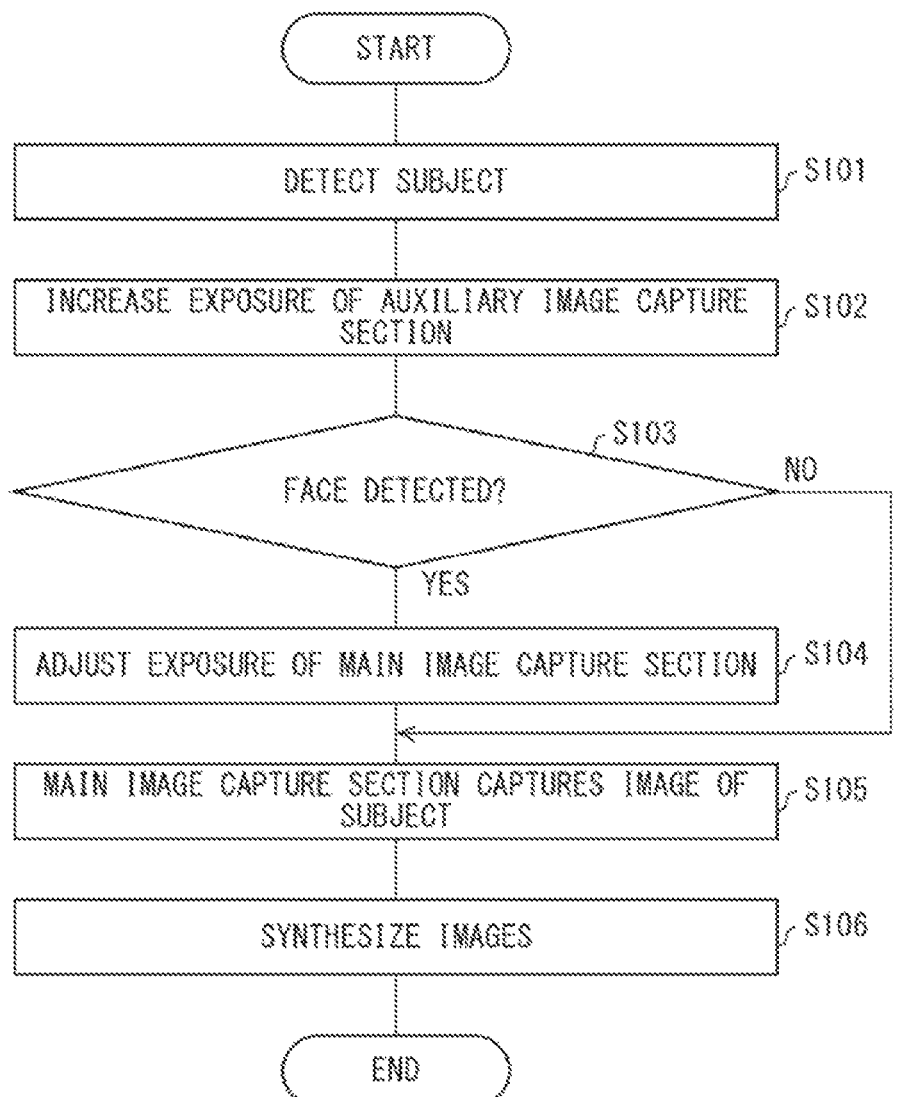
FIG. 3 is a view showing another embodiment (Embodiment 2) of the flowchart of the processing carried out by the twin-lens image capture device of FIG. 1.

FIG. 3 shows a flowchart of an image capture processing carried out by an image capture processing device 50 of a twin-lens image capture device 1 of Embodiment 2. Main configurations of the twin-lens image capture device 1 of Embodiment 2 are identical to those of the twin-lens image capture device 1 of Embodiment 1 illustrated in FIG. 1. The flowchart of FIG. 3 differs from the flowchart (FIG. 2) of Embodiment 1 in that step S106 is carried out subsequent to step S105 at which an image of a subject is captured by a main image capture section 10 which has been adjusted to have an exposure appropriate for a face region.

At step S106, image data which was generated by an auxiliary image capture section 20 at a point in time when the face region was detected at step S103 and image data which was obtained by the main image capture section 10 at step S105 are synthesized so as to generate synthesized image data. Generation of the synthesized image data is carried out by an image processing section 32.

By thus synthesizing images which differ in exposure, it is possible to obtain an image having a wide dynamic range. Note that synthesis of images which differ in exposure can be carried out by a known method.

Embodiment 3

The following description will discuss Embodiment 3 of the present invention. For easy explanation, the like reference signs will be given to members each having the like function as a member described in Embodiment 1, and descriptions on such a member will be omitted.

Figure 4:
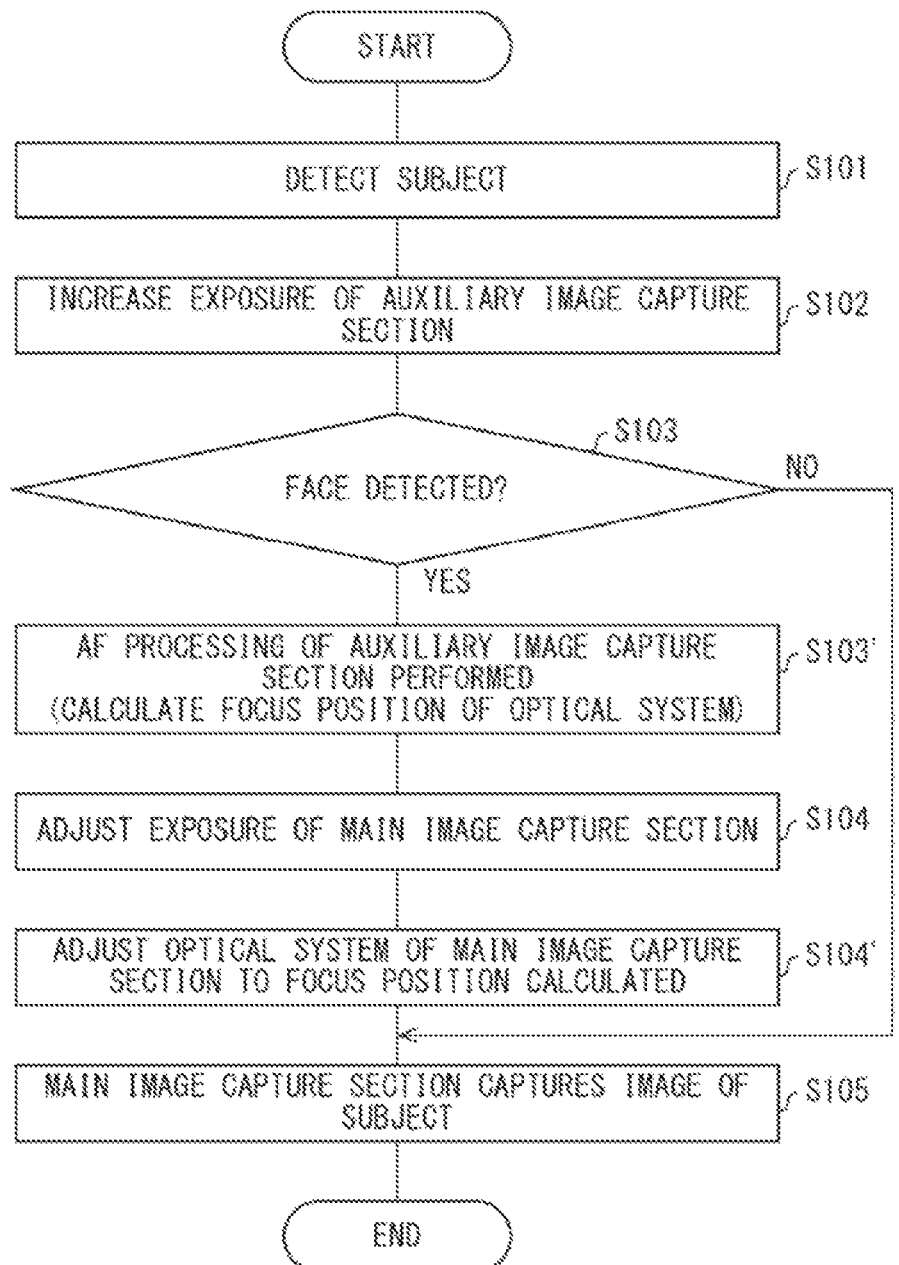
FIG. 4 is a view showing another embodiment (Embodiment 3) of the flowchart of the processing carried out by the twin-lens image capture device of FIG. 1.

FIG. 4 shows a flowchart of an image capture processing carried out by an image capture processing device 50 of a twin-lens image capture device 1 of Embodiment 3. Main configurations of the twin-lens image capture device 1 of Embodiment 3 are identical to those of the twin-lens image capture device 1 of Embodiment 1 illustrated in FIG. 1. The flowchart of FIG. 4 differs from the flowchart (FIG. 2) of Embodiment 1 in a processing flow from after face detection is carried out (after step S103 in FIG. 2) to when a main image capture section 10 captures an image (step S105 in FIG. 2).

FIG. 4 shows the flowchart of the image capture processing carried out by the image capture processing device 50 of the twin-lens image capture device 1 of Embodiment 3.

In Embodiment 3, face detection is carried out by a face detection section 40 (step S103), and in addition, an image processing section 32 obtains image data of a subject which image data has been generated by an auxiliary image capture section 20, and an AF processing is carried out so as to detect a focus position of a lens of the auxiliary image capture section 20 (step S103'). Note that even in a case where no face has been detected by the face detection section 40 at step S103, image data of the subject which image data has been generated by the auxiliary image capture section 20 is obtained by the image processing section 32, and an AF processing is carried so as to detect a focus position of the lens.

Then at step S104, the face detection section 40 notifies the image processing section 32 of a face region, an exposure of the main image capture section 10 is adjusted by the capture control section 31 so as to be appropriate for the face region, and then the process proceeds to step S104' shown in FIG. 4.

At step S104' (control step), a position of the lens of the main image capture section 10 is moved to the focus position of the lens which focus position was calculated at step S103', and an image is captured by the main image capture section 10 at step S105.

By performing, as described in Embodiment 3, an AF operation with use of the auxiliary image capture section 20 having a high exposure, it becomes easier for the main image capture section 10 to perform autofocus when capturing an image, even in a case where the capturing of the image is performed with a low illuminance.

Embodiment 4

The following description will discuss Embodiment 4 of the present invention. For easy explanation, the like reference signs will be given to members each having the like function as a member described in Embodiment 1, and descriptions on such a member will be omitted.

Figure 5:
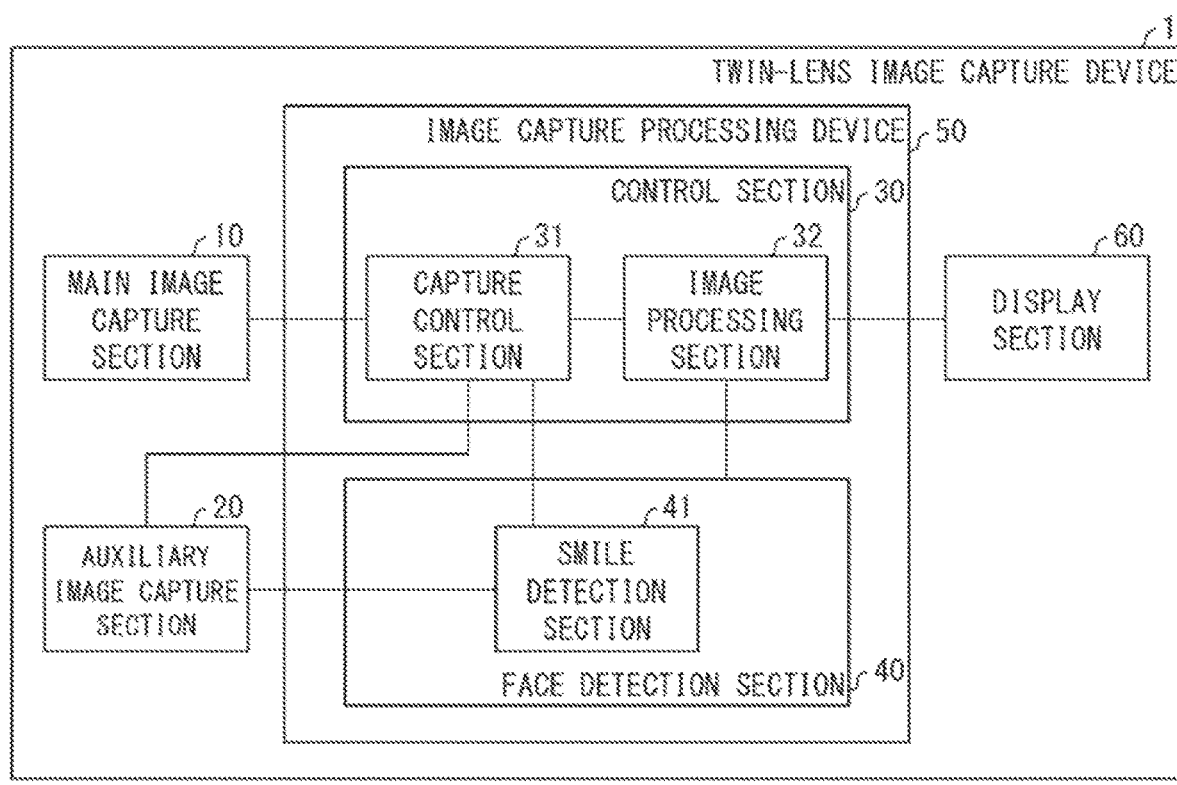
FIG. 5 is a block diagram illustrating a configuration of one mode (Embodiment 4) of an image capture processing device in accordance with the present invention together with a configuration of a twin-lens image capture device which is one mode (Embodiment 1) of the electronic device in accordance with the present invention.

FIG. 5 is a block diagram illustrating a configuration of a twin-lens image capture device 1 in Embodiment 4. The configuration of Embodiment 4 differs from that of Embodiment 1 in terms of a face detection section 40 of an image capture processing device 50.

Specifically, the image capture processing device 50 of the twin-lens image capture device 1 of Embodiment 4 includes a face detection section 40 including a smile detection section 41. The smile detection section 41 obtains image data outputted from an auxiliary image capture section 20, and performs a smile detection processing on the image data so as to detect a smile region of a person who is included in the image. The smile detection processing is performed with use a known algorithm.

Upon detection of a smile, the smile detection section 41 simultaneously outputs a timing signal to the capture control section 31 of a control section 30.

Upon reception of the timing signal, the capture control section 31 controls, at that timing, the main image capture section 10 to capture an image (step S105). The main image capture section 10, as described in Embodiment 1, captures an image with use of an exposure adjusted so as to be appropriate for the face.

[Software Implementation Example]

Control blocks of the twin-lens image capture device 1 (particularly, the image capture processing device 50) may be realized by a logic circuit (hardware) provided in an integrated circuit (IC chip) or the like or may be realized by software as executed by a CPU (Central Processing Unit).

In the latter case, the image capture processing device 50 includes: a CPU that executes instructions of a program (program for controlling the image capture processing device) that is software realizing the foregoing functions; ROM (Read Only Memory) or a storage device (each referred to as "storage medium") storing the program and various kinds of data in such a form that they are readable by a computer (or a CPU); and RAM (Random Access Memory) that develops the program in executable form. The object of the present invention can be achieved by a computer (or a CPU) reading and executing the program stored in the storage medium. The storage medium may be "a non-transitory tangible medium" such as a tape, a disk, a card, a semiconductor memory, and a programmable logic circuit.

Embodiments 1 through 4 have each described an example case in which image data outputted from the main image capture section 10 is obtained, subjected to an image processing, and displayed on the display section 60. Note, however, that the present invention may employ a configuration in which a storage section is provided and (i) image data outputted from the main image capture section 10 is stored in the storage section or (ii) image data is displayed on the display section as well as being stored in the storage section.

Further, although Embodiments 1 through 4 have each described an example case in which the main image capture section 10 and the auxiliary image capture section 20 detect a subject at step S101, it is only necessary to employ, in order to enable face detection at step S103, a configuration in which at least the auxiliary image capture section 20 detects a subject. That is, it is possible to employ a configuration in which the main image capture section 10 does not detect a subject.

[Recap]

An image capture processing device 50 in accordance with Aspect 1 of the present invention is an image capture processing device including: a face detection section 40 configured to perform face detection so as to detect a face from an image of a subject, the image being captured by a first image capture section (auxiliary image capture section 20) which captures the image of the subject; and a control section 30 configured to control, on the basis of a result of the face detection performed by the face detection section 40, a second image capture section (main image capture section 10) to capture an image of the subject, the second image capture section being different from the first image capture section (auxiliary image capture section 20).

According to the above configuration, face detection is always performed with use of the auxiliary image capture section 20. Accordingly, even in a case where no face is included in an angle of view at first but a face later comes into the angle of view, the face is successfully detected. This enables an improvement in accuracy of face detection, and allows obtaining an optimum image in which focus and exposure are adjusted in conformity with a detected face.

More specifically, in Aspect 2 of the present invention, the image capture processing device 50 in accordance with above Aspect 1 is configured such that the control section 30 (i) controls the first image capture section (auxiliary image capture section 20) to have an exposure condition appropriate for performing the face detection and (ii) controls, on the basis of the result of the face detection performed by the face detection section 40, the second image capture section (main image capture section 10) to have an exposure appropriate for the face. This configuration allows bringing about the above-described effect.

In Aspect 3 of the present invention, the image capture processing device 50 in accordance with above Aspect 1 or 2 may be configured such that the control section 30 controls the first image capture section (auxiliary image capture section 20) to have an exposure higher than that of the second image capture section (main image capture section 10).

According to the above configuration, increasing the exposure of the auxiliary image capture section 20 enables facilitating the face detection.

In Aspect 4 of the present invention, the image capture processing device 50 in accordance with any one of above Aspects 1 through 3 may be configured such that the first image capture section (auxiliary image capture section 20) has a smaller number of pixels than the number of pixels of the second image capture section (main image capture section 10).

The above configuration enables a cost reduction.

In Aspect 5 of the present invention, the image capture processing device 50 in accordance with above Aspect 3 may be configured such that the control section 30 obtains and synthesizes the image captured by the first image capture section (auxiliary image capture section 20) and the image captured by the second image capture section (main image capture section 10).

According to the above configuration, synthesizing images which differ in exposure allows obtaining an image having a wide dynamic range.

In Aspect 6 of the present invention, the image capture processing device 50 in accordance with above Aspect 3 may be configured such that the control section 30 (i) calculates a focus position on the basis the result of the face detection performed by the face detection section 40 and with use of an optical system of the first image capture section (auxiliary image capture section 20) and (ii) adjusts an optical system of the second image capture section (main image capture section 10) to the focus position calculated.

According to the above configuration, by performing an AF operation with use of the auxiliary image capture section 20 in a state where the auxiliary image capture section 20 has an exposure higher than that of the main image capture section 10, it becomes easier for the main image capture section 10 to perform autofocus when capturing an image, even in a case where the capturing of the image is performed with a low illuminance.

In Aspect 7 of the present invention, the image capture processing device 50 in accordance with any one of Aspects 1 through 6 may be configured such that: the face detection section 40 includes a smile detection section 41 configured to detect a smile from the image captured by the first image capture section (auxiliary image capture section 20); and the control section 30 controls, at timing when the smile detection section 41 has detected a smile, the second image capture section (main image capture section 10) to capture the image of the subject with use of an exposure appropriate for the face.

According to the above configuration, an optimum image in which focus and exposure are adjusted in conformity with a face can be obtained at timing at which a smile has been detected.

An electronic device (twin-lens image capture device 1) in accordance with Aspect 8 of the present invention is an electronic device including: the above-described image capture processing device 50; the first image capture section (auxiliary image capture section 20); and the second image capture section (main image capture section 10).

The above configuration allows bringing about the same effects as those of the above-described image capture processing device 50.

An image capture processing method in accordance with Aspect 9 of the present invention is an image capture processing method including: a face detection step of performing face detection so as to detect a face from an image of a subject, the image being captured by a first image capture section which captures the image of the subject; and a control step of controlling, on the basis of a result of the face detection performed in the face detection step, a second image capture section to capture an image of the subject, the second image capture section being different from the first image capture section.

This allows bringing about the same effects as those of the above-described image capture processing device 50.

A program, in accordance with Aspect 10 of the present invention, for controlling an image capture processing device control is program for controlling an image capture processing device, the program being configured to cause a computer to function as each section of the image capture processing device 50.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1: twin-lens image capture device (electronic device)
10: main image capture section (second image capture section)
20: auxiliary image capture section (first image capture section)
30: control section
31: capture control section (control section)
32: image processing section (control section)
40: face detection section
41: smile detection section
50: image capture processing device
60: display section

The invention claimed is:
1. An image capture processing device comprising:
a face detection section configured to perform face detection so as to detect a face from an image of a subject, the image being captured by a first image capture section which always captures the image of the subject in an average photometry mode in which photometry of an average brightness of an entire screen is performed so as to control an exposure; and
a control section configured to control, on the basis of a result of the face detection performed by the face detection section, a second image capture section to capture an image of the subject, the second image capture section being different from the first image capture section, the control section controlling the first image capture section to have the exposure higher than that of the second image capture section, in a case where the face detection section does not detect a face, the control section controlling the second image capture section to capture the subject while adjusting exposure of the second image capture section based on information on exposure set in the control section, the control section obtaining and synthesizing the image captured by the first image capture section and the image captured by the second image capture section.

2. The image capture processing device as set forth in claim 1, wherein the control section (i) controls the first image capture sec ti CHI to have an exposure condition appropriate for performing the face detection and (ii) controls, on the basis of the result of the face detection performed by the face detection section, the second image capture section to have an exposure appropriate for the face.

3. The image capture processing device as set forth in claim 1, wherein the first image capture section has a smaller number of pixels than the number of pixels of the second image capture section.

4. The image capture processing device as set forth in claim 1, wherein the control section (i) calculates a focus position on the basis the result of the face detection performed by the face detection section and with use of an optical system of the first image capture section and (ii) adjusts an optical system of the second image capture section to the focus position calculated.

5. The image capture processing device as set forth in claim 1, wherein:

the face detection section includes a smile detection section configured to detect a smile from the image captured by the first image capture section; and the control section controls, at timing when the smile detection section has detected a smile, the second image capture section to capture the image of the subject with use of an exposure appropriate for the face.

6. An electronic device comprising:
an image capture processing device recited in claim 1;
the first image capture section; and
the second image capture section.

7. A computer-readable non-transitory recording medium on which a program for controlling an image capture processing device recited in claim 1 is stored, the program being configured to cause a computer to function as each section of the image capture processing device.

8. An image capture processing method comprising:

a face detection step of performing face detection so as to detect a face from an image of a subject, the image being captured by a first image capture section which always captures the image of the subject in an average photometry mode in which photometry of an average brightness of an entire screen is performed so as to control an exposure; and a control step of controlling, on the basis of a result of the face detection performed in the face detection step, a second image capture section to capture an image of the subject, the second image capture section being different from the first image capture section, in the control step, the first image capture section being controlled to have the exposure higher than that of the second image capture section, in the control step, in a case where the face detection step does not detect the face, the second image capture section to capture the subject while adjusting exposure of the second image capture section based on information on exposure set, in the control step, the image captured by the first image capture section and the image captured by the second image capture section being obtained and synthesized.

* * * * *